Aug. 26, 1969 H. E. MURPHY 3,463,928
FREQUENCY-SELECTIVE NEGATIVE FEEDBACK ARRANGEMENT FOR PHOTOTRANSISTOR FOR ATTENUATING UNWANTED SIGNALS
Filed Nov. 3, 1966 2 Sheets-Sheet 1

INVENTOR.
HOWARD E. MURPHY
BY Norman N. Kunitz
Ross J. Brown
ATTORNEYS

INVENTOR.
HOWARD E. MURPHY
BY Norman N. Kunitz
Roger L. Borovoy
ATTORNEYS

United States Patent Office 3,463,928
Patented Aug. 26, 1969

3,463,928

FREQUENCY-SELECTIVE NEGATIVE FEEDBACK ARRANGEMENT FOR PHOTOTRANSISTOR FOR ATTENUATING UNWANTED SIGNALS

Howard E. Murphy, Redwood City, Calif., assignor to Fairchild Camera and Instrument Corporation, Syosset, N.Y., a corporation of Delaware Filed Nov. 3, 1966, Ser. No. 591,916
Int. Cl. H01j *39/12*
U.S. Cl. 250—214 4 Claims This invention relates to an improved transistor photodetection circuit, and more particularly to a transistor photodetection circuit which can detect low-level intensity or amplitude-modulated light signals in the presence of larger ambient or D.C. lighting levels.

The use of transistors, commonly referred to as phototransistors, for the detection of light signals, either D.C. or intensity-modulated, e.g., pulsating light, is well-known in the art. A circuit for detecting intensity-modulated light signals normally consists of a phototransistor having an amplifier connected to its output which is tuned to the modulation frequency or the band of modulation frequencies to be detected. Although such circuits operate satisfactorily for certain applications, a number of problems occur when it is desired to detect a small intensity-modulated signal in the presence of a high intensity ambient light signal. The noise output of a phototransistor is predominantly a "shot noise" which varies directly as the square root of the total transistor current, hence the photocurrent increase due to the ambient or "non-signal" light decreases the signal-to-noise ratio at the photodetector output. Additionally, power line ripple detected as intensity-modulation from line driven ambient illumination will add harmonics of the power line frequency to the photodetector output signal. This can cause serious performance degradation for many applications.

Another problem which may occur in the prior art photodetection circuit mentioned above is that of saturation of the phototransistor by the high photocurrent created by absorption of a high ambient lighting level. One way in which the saturation problem can be eliminated is to use a very low value of resistance for the phototransistor load resistance. The use of such a low value of resistance, however, while curing the saturation problem, decreases the signal-to-noise ratio in the detection circuit, and hence, is a self-defeating solution when it is desired to detect low level intensity-modulated signals in the presence of the large ambient signal.

Yet another problem sometimes encountered in prior art circuits are changes in the bias current and voltage applied to the phototransistor and amplifier input stages caused by thermal effects.

The photodetection circuit according to the invention overcomes the shortcomings of the prior art devices by biasing the phototransistor so that the effects of the ambient light signal and other signals having frequencies outside a preselected pass-band are eliminated from the output signal of the circuit while at the same time allowing a maximum value of load resistance to be used for the phototransistor. This result, which is attained by operating the phototransistor within a negative feedback loop, allows intensity-modulated signal light to be detected when the ratio of the ambient lighting level to the level of the intensity-modulated signal is several orders of magnitude. Briefly, the photodetection circuit according to the invention comprises a phototransistor having its emitter and collector connected in series with a load resistor between a supply voltage terminal and a point of reference potential, and having a negative feedback path connected between its output and base. The feedback path includes an amplifier and a filter circuit, frequently a low pass filter, which passes D.C. signals and only those A.C. signals having frequencies outside a band or range of frequencies which it is desired to detect. The output terminal for the circuit is connected to the feedback path between the output of the phototransistor and the input of the filter circuit. As can be appreciated, such a feedback circuit will cause electrical signals and noise generated by light with modulation frequencies outside the desired band and temperature caused variation in phototransistor current to be drastically reduced in size at the output of the phototransistor; hence allowing the detection of relatively small signals from illumination intensity-modulated at the desired frequency.

The invention and the advantages thereof will be more fully understood from the following detailed description taken in conjunction with the accompanying drawings wherein.

Figure 1:
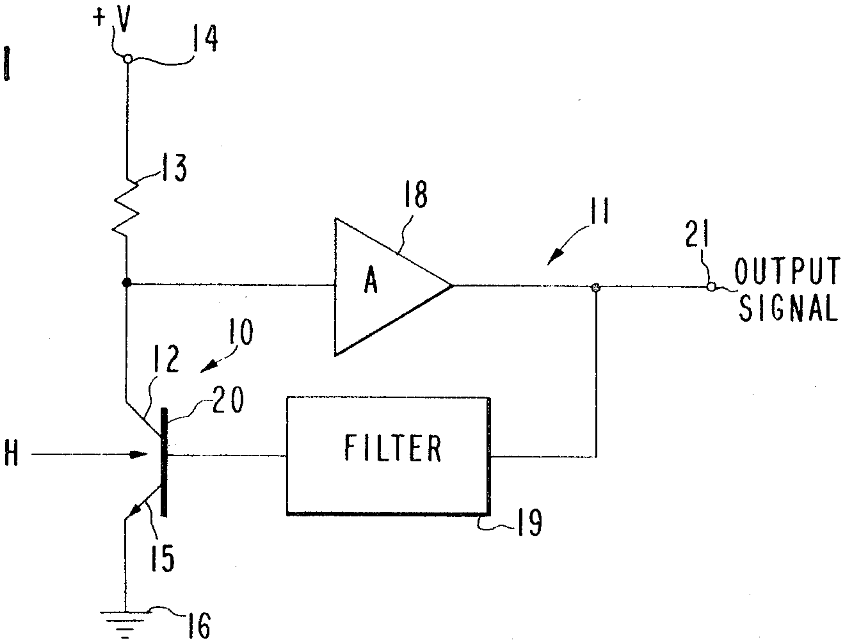
FIG. 1 is a block diagram illustrating the general principle of the invention.

Referring now to FIG. 1, there is shown a block diagram of the basic circuit of the invention which consists essentially of a phototransistor 10 and a negative feedback path 11. The phototransistor 10 has its collector 12 connected by a load resistor 13 to a terminal 14 which is connected to a source of direct current supply potential designated as +V. The resistor 13 is typically made as large as possible, considering the frequency of the signals to be detected, in order to obtain maximum signal voltage output from the phototransistor. Emitter 15 of phototransistor 10 is connected to a point of reference potential 16, indicated in the embodiment of FIG. 1 as a ground potential.

The negative feedback path 11 consists essentially of an amplifier 18, which preferably has a high voltage gain and a high input impedance, connected in series with a filter 19. Preferably, as illustrated, the output of the phototransistor 10 is taken from the collector 12, and accordingly, in order that a negative feedback signal be provided at the base 20 of the transistor 10, the amplifier 18 is of the non-inverting type, i.e., there is no change in phase between the input signal to the amplifier and the output signal therefrom. It should be understood, however, that it is also possible to derive an output signal from the emitter 15 of the phototransistor, and that if the emitter is used as the output of the phototransistor, the amplifier 18 would necessarily be of the inverting type in order that the signal supplied to the base 20 cause negative feedback.

Filter 19 is designed so that it will pass D.C. signals caused by steady state ambient light impinging on the phototransistor 10, and also will pass those A.C. signals generated by light intensity-modulated at frequencies other than the frequency or band of frequencies desired to be detected. Typically, the filter 19 will be of the low pass type. However, if desired, the filter may have a particular bandpass or be of the band reject type, for example, a twin T notch filter to provide for selective detection of very narrow bandwidth modulation.

With the circuit shown in FIG. 1, the collector current through phototransistor 10 is equal to the base current times the current gain of phototransistor 10. Any collector current flowing in the phototransistor 10 will develop a voltage drop across the load resistor 13 which serves as the input signal to the non-inverting amplifier 18. Since the base current of phototransistor 10 is determined by the output voltage from the amplifier 18, the circuit shown in FIG. 1 is equivalent to a conventional negative feedback amplifier when considering bias stability, gain, noise reduction, and other circuit parameters. The shaping of the bandpass characteristic of the feedback path, including the filter, may be accomplished in the conventional manner well-known in the art for negative feedback amplifier design to achieve stability.

Connected to the feedback path 11 between the output of the phototransistor 10 and the input of the filter 19 is an output terminal 21 for the circuit. Preferably, as indicated, the output terminal 21 is connected to the feedback path 11 at a location where the signal voltage is an amplified version of the output signal voltage developed by signal photocurrent through load resistor 13. However, it is to be understood that if desired, the output terminal from the circuit may be connected directly to the output of phototransistor 10, i.e., the collector 12.

Turning now to the operation of the circuit shown in FIG. 1, when incident light flux (indicated by the arrow marked H in the figures) impinges upon transistor 10, a photocurrent is induced which will tend to increase the current flowing in the collector 12. The increased collector current develops a voltage across resistor 13 which is amplified by the amplifier 18 and, if the frequency of the signal is within the passband of the filter 19, a negative feedback signal is applied to the base 20 of phototransistor 10 which changes the base current in a direction to reduce the collector current change, and hence, effectively maintains the current through phototransistor 10 and the output voltage appearing at terminal 21 at a constant level. For received light signals having modulation frequencies outside of the passband of the filter 18, however, the negative feedback signal is greatly reduced and hence the amplifier 18 provides an output signal voltage which is proportional to the induced photocurrent. It should be noted that with the above circuit, since the filter always passes D.C. or steady state current, the D.C. current through the phototransistor is maintained very near a preselected value as determined by the circuit parameters even though a large ambient light signal is received. This constant bias current provides the desirable advantage that the phototransistor is maintained in a preselectable operating region where the sensitivity, gain, noise, and bandwidth are optimum.

Figure 2:
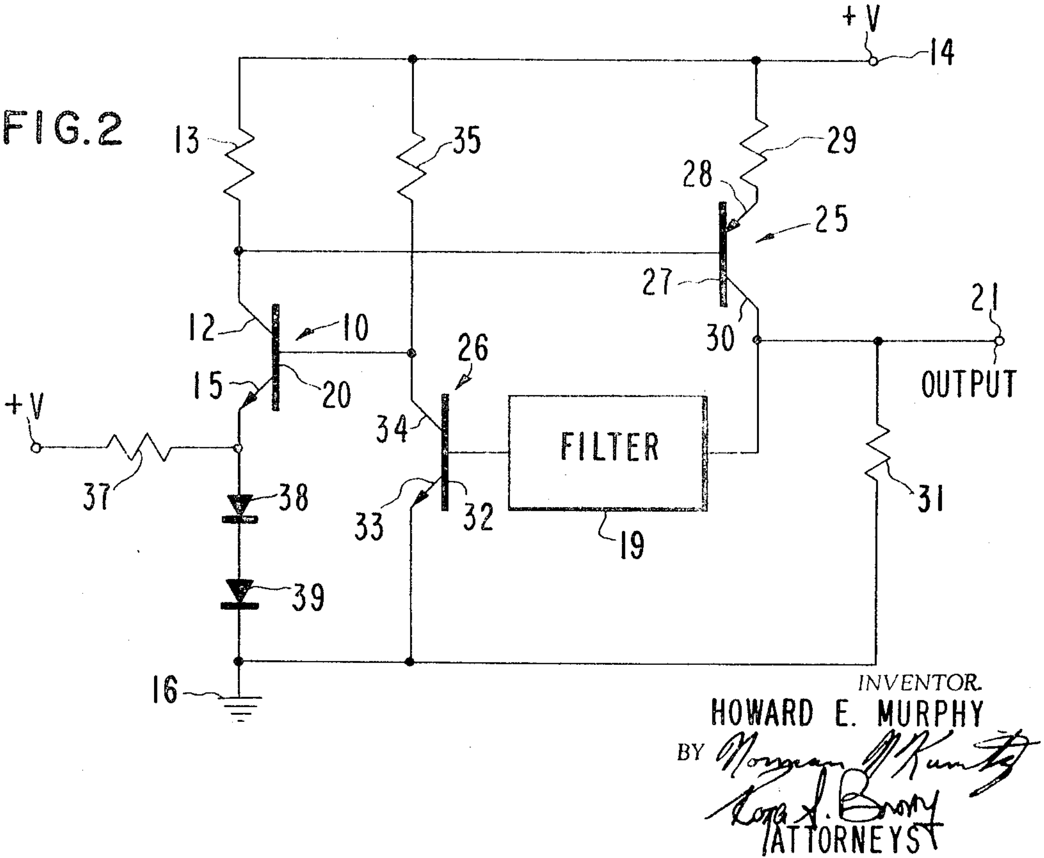
FIG. 2 is a schematic diagram of one embodiment of the invention.

Referring now to FIG. 2 there is shown a circuit diagram of one embodiment of the invention. In this figure and all succeeding figures, the structures which are similar to those shown in FIG. 1 have been designated with the same reference numeral. In the embodiment of the invention shown in FIG. 2, the amplifier is comprised of a pair of series connected amplifier stages, transistors 25 and 26, each of which inverts the input signal thereto, with the filter circuit 19 used as an interstage coupling network between the two amplifier stages. The transistor 25 has its base 27 connected to the collector 12 of phototransistor 10, and its emitter 28 connected via biasing resistor 29 to the supply voltage input terminal 14. The collector 30 of transistor 25 is connected (via a resistor 31, which serves as the load resistor of transistor 25) to the point of reference potential 16 and also to the input of filter circuit 19; the output of filter circuit 19 being coupled to the base 32 of transistor 26. The emitter 33 of transistor 26 is connected to the point of reference potential 16 while its collector 34 is connected to the base 20 of phototransistor 10 and to the supply voltage input terminal 14 via a load resistor 35. The output terminal 21 is connected to the output of amplifier 25, i.e., collector 30 so that the output signal from the circuit is developed across the resistance 31. Although the output terminal 21 may be connected to the base 27 of transistor 25, preferably it is connected to the collector 30 as shown both to provide an output signal voltage with a greater amplitude and to provide an output signal at a lower output impedance level.

In order to maintain the linearity of circuit operation, it is necessary to provide adequate collector bias voltage for transistor 26. One way this may be accomplished is by maintaining the bias on the emitter 15 of phototransistor 10 at a value slightly above the reference potential. Although any desired method of biasing the emitter 15 may be used, for example, by inserting a battery between the emitter 15 and the point of reference potential 16, preferably, as indicated in FIG. 2, the bias potential is obtained by connecting emitter 15 through a dropping resistor 37 to a source of supply voltage (which may, for example, be taken from terminal 14) and connecting a small resistor between the emitter 15 and the point of reference potential. Preferably, the small resistance required may be attained by connecting one or more diodes, e.g., diodes 38 and 39, between the emitter 15 and the point 16, thereby obtaining an effectively low value of D.C. emitter resistance, a predictable voltage drop, and a circuit requiring a minimum current drain. Moreover, diodes are easier to fabricate in integrated circuits than resistors having such small values.

In the operation of the circuit of FIG. 2, with no light incident on phototransistor 10, its collector current is a value determined by resistance of resistor 13, resistance of resistor 35, and other circuit parameters. When light flux, however, impinges on the phototransistor 10, the generated photocurrent tends to increase the voltage drop across the load resistor 13 of the phototransistor 10. This increase in voltage is amplified by transistor 25. If the signals are of frequencies within the passband of the filter 19, they are coupled to the base 32 of transistor 26 via the filter 19, thus causing the amplifier stage 26 to draw still more collector current. This increase in the collector current of transistor 26 decreases the base bias current into phototransistor 10, thereby tending to maintain the collector current of phototransistor 10 near a predetermined value. Photocurrent output signals from phototransistor 10 having frequencies outside the passband of filter 19, however, will not cause any change in the feedback signal to the phototransistor 10 and hence, are not attenuated. These out of passband signals therefore become the output signals from the photodetector circuit.

While many different values of circuit parameters will allow the circuit of FIG. 2 to operate satisfactorily, the following values may be used for a satisfactorily operating circuit:

| | | |
|---|---|---|
| Phototransistor **10** | | 2N986 |
| Resistor **13** | megohm | 1 |
| Transistor **25** | | 2N3964 |
| Transistor **26** | | 2N3117 |
| Resistance **29** | kilohms | 5.1 |
| Resistance **31** | do | 5.1 |
| Resistance **35** | megohm | 1 |
| Resistance **37** | kilohms | 10 |
| Diodes **38** and **39** | | 1N3062 |
| Supply voltage at terminal **14** | volts D.C. | +12 |

Figure 3:
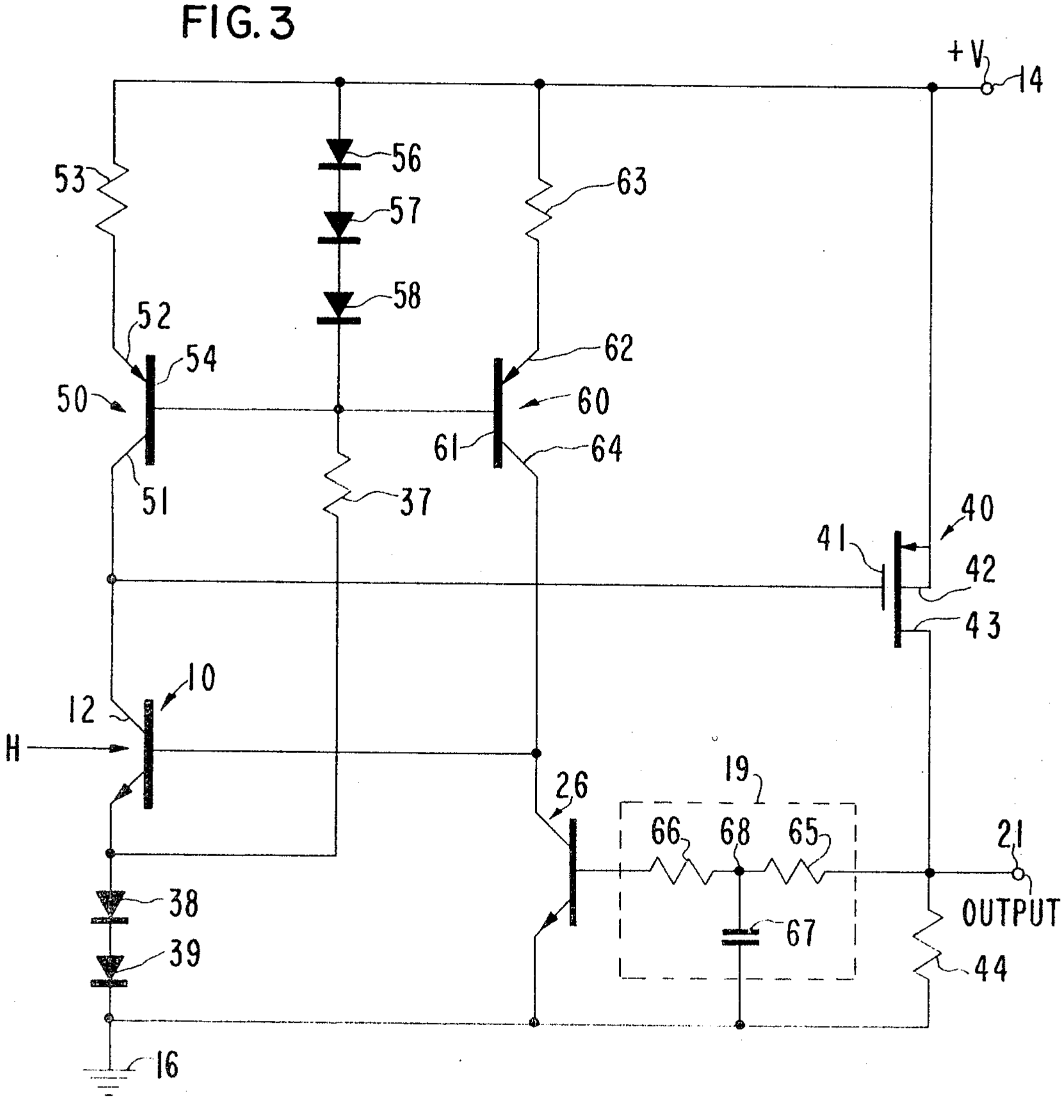
FIG. 3 is a schematic diagram of another embodiment of the invention.

Referring now to FIG. 3, there is shown another embodiment of a photodetection circuit according to the invention. This circuit is similar in principle to that of FIG. 2, using a similar type feedback arrangement with the exception that the transistor 25 forming the first amplifier stage of FIG. 2 has been replaced by a metal oxide silicon field effect (MOS) transistor 40 having its gate electrode 41 connected to the output or collector 12 of the phototransistor 10 and its source and drain electrodes connected between the supply voltage input terminal 14 and the input to the filter 19. The amplified signal from the phototransistor 10 appearing at output terminal 21 is developed across the load resistor 44 of the MOS transistor 40. The use of an MOS transistor 40 with its inherently high input impedance in place of a conventional bipolar transistor serves to increase the load resistance for the phototransistor 10. This is a decided advantage in the circuit, since, as indicated above, increasing the load resistance of the phototransistor 10 will also tend to increase the signal-to-noise ratio in the detected output signal voltage at terminal 21.

In order to further increase the load resistance for phototransistor 10 without the need for resistors having very large resistance values or the need for high potential supply voltage sources, the load resistor 13 (FIG. 2) is preferably replaced by a transistor 50 in the circuit of FIG. 3 of polarity type (in the instant example a PNP instead of an NPN transistor) opposite to that of the phototransistor 10. The transistor 50 has its collector 51 connected to the collector 12 of phototransistor 10 and its emitter 52 conneced by a bias resistor 53 to the supply voltage input terminal 14. The transistor 50 is biased, in any manner well-known in the art, for constant collector current by connecting its base 54 across the resistor 53 via a low impedance voltage source, for example, a battery, in order to maintain a constant voltage drop across resistor 53. Preferably, as shown, the low impedance voltage source comprises a small resistance, for example, three series-connected diodes 56, 57, and 58 connected between base 54 and terminal 14. With this mode of connection, the transistor 50 acts as a current source to provide a very high collector lead resistor for the phototransistor 10. Similarly, the load resistor 35 (FIG. 2) of the transistor 26 is preferably replaced by transistor 60, of the opposite polarity type to that of transistor 26, which is also biased for constant collector current, for example, as shown, by connecting its base 61 to the terminal 14 via the series-connected diodes 56–58. The transistor 60 has its emitter 62 connected to the terminal 14 via a bias resistance 63 and its collector 64 connected into the collector of the transistor 26. The transistor 60, accordingly acts not only as a high load resistor for the transistor 26 but also as a current source serving to bias the phototransistor 10. By the use of the transistors 50 and 60 as the load resistors of the phototransistor 10 and of the transistor 26 respectively, the effective load resistance of the phototransistor 10 is greatly increased and hence, the signal-to-noise ratio of the entire circuit can be measurably increased, thereby permitting the detection of very small A.C. signals.

As indicated above, the filter 19 will typically be of the low pass type. Such a filter is shown in FIG. 3 connected between the output of MOS transistor 40 and the base of transistor 26, and consists, in this example, of a pair of series-connected resistances 65 and 66, and a capacitor 67 connected between the common junction 68 of the two resistors and the point of reference potential. The cut-off frequency of the low pass filter may be set at any desired point. For example, by use of 1 megohm resistors for each of the resistors 65 and 66 and 0.001 microfarad capacitor for the capacitor 67, the filter 19 will pass all signals below 1 kHz. to the base of the transistor 26. Since this filter is used in the negative feedback loop, the pass-band of the detection circuit includes frequencies above the filter cut-off frequency, and below the upper operating frequency of the active devices.

Figure 4:
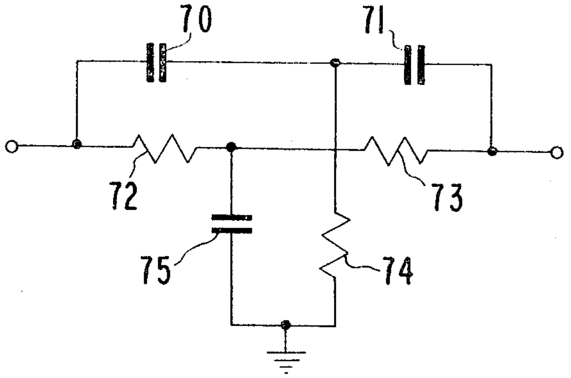
FIG. 4 is a schematic diagram of an embodiment of a filter which can be used with the circuits of FIGS. 2 and 3.

If it is desired to detect only signals within a narrow bandpass, differently designed filters may be used. For example, FIG. 4 shows a filter network which may be used in place of the filter network shown in FIG. 3 when it is desired to detect light intensity-modulated at a frequency near a preselected frequency. The filter network of FIG. 4, commonly called a twin T notch filter, will pass signals having all frequencies except the preselected frequency or frequency band which it is desired to detect. For example, by utilizing values of 70 pf. for each of the capacitors 70 and 71, 2.2 megohms for each of the resistors 72, 73, 1.1 megohm for the resistor 74, and 140 pf. for the capacitor 75, the filter network will pass signals with frequencies well separated from 1 kHz. and, hence, the output voltage from the circuit will contain primarily only signals with frequencies near 1 kHz.

Suitable values for the components of the circuit shown in FIG. 3 are as follows:

| | | |
|---|---|---|
| Phototransistor **10** | | 2N986 |
| Transistor **26** | | 2N3117 |
| Resistor **37** | kilohms | 10 |
| Diodes **38** and **39** | | 1N3062 |
| MOS Transistor **40** | | 2N4067 |
| Resistor **44** | kilohms | 2 |
| Transistor **50** | | 2N3964 |
| Resistor **53** | kilohms | 1.2 |
| Diodes **56, 57**, and **58** | | 1N3062 |
| Transistor **60** | | 2N3964 |
| Resistor **63** | kilohms | 180 |
| Supply voltage at terminal **14** | volts D.C. | +12 |

As can easily be appreciated, the circuits described above according to the invention provide a relatively simple way of detecting the presence of a low-level intensity-modulated light signal in the presence of a high ambient lighting level. Moreover, because of the particular nature of the circuit, i.e., the use of negative feedback, the circuits are very stable both from the standpoint of bias voltages and temperature. Additionally due to the particular manner employed for obtaining the high load resistances for the various transistors in the circuit, it is possible to obtain a circuit which not only operates at very low power levels but is readily applicable to integrated circuit techniques.

Obviously, various other modifications of the invention are possible in light of the above teachings without departing from the spirit and scope of the invention. Therefore, the invention is to be limited only as recited in the appended claims of the invention.

What is claimed is:

1. A photodetector circuit for detecting intensity modulated light signals having a predetermined band of modulation frequencies comprising:

a phototransistor having its emitter and collector connected in series with a load transistor between a supply voltage input terminal and a point of reference potential, said load transistor being of a conductivity type opposite to that of said phototransistor and having its collector connected to the collector of said phototransistor and its emitter connected to a supply voltage terminal, said load transistor being biased for constant collector current;

a negative feedback path connected between the collector and the base of said phototransistor, said feedback path including an amplifier connected in series with a filter circuit which passes D.C. signals and only those A.C. signals having frequencies outside of said predetermined frequency band; and an output terminal for said circuit connected to said feedback path between the output of said phototransistor and the collector of said filter circuit.

2. The circuit of claim 1 wherein said amplifier comprises:

a first transistor having its base connected to the collector of said phototransistor, its collector connected to the input of said filter circuit and its emitter connected to a supply voltage terminal; and a second transistor having its base connected to the output of said filter, its collector connected to the base of said phototransistor and its emitter connected to a point of reference potential.

3. The circuit of claim 1 wherein said amplifier comprises:

an MOS transistor having its gate electrode connected to the collector of said phototransistor and its source and drain connected between a supply voltage terminal and the input of said filter, and a first transistor having its base connected to the output of said filter, its collector connected to the base of said phototransistor and to a supply voltage terminal by a load resistor, and its emitter connected to a point of reference potential.

4. The circuit of claim 3 wherein the load transistor of said first transistor comprises:

a third transistor of a conductivity type opposite to that of said first transistor having its collector connected to the collector of said first transistor and its emitter connected to a supply voltage input terminal, said third transistor being biased for constant collector current.

References Cited

UNITED STATES PATENTS

| | | | |
|---|---|---|---|
| 2,857,462 | 10/1958 | Hung Chan Lin | 330—28 |
| 3,096,488 | 7/1963 | Lomask | 330—109 |
| 3,257,631 | 6/1966 | Evans | 330—28 |

RALPH G. NILSON, Primary Examiner

MARTIN ABRAMSON, Assistant Examiner

U.S. Cl. X.R.

307—311; 330—28, 109